M. A. BUCH.
AUTOMOBILE DOOR.
APPLICATION FILED APR. 3, 1915.
1,158,438. Patented Nov. 2, 1915.
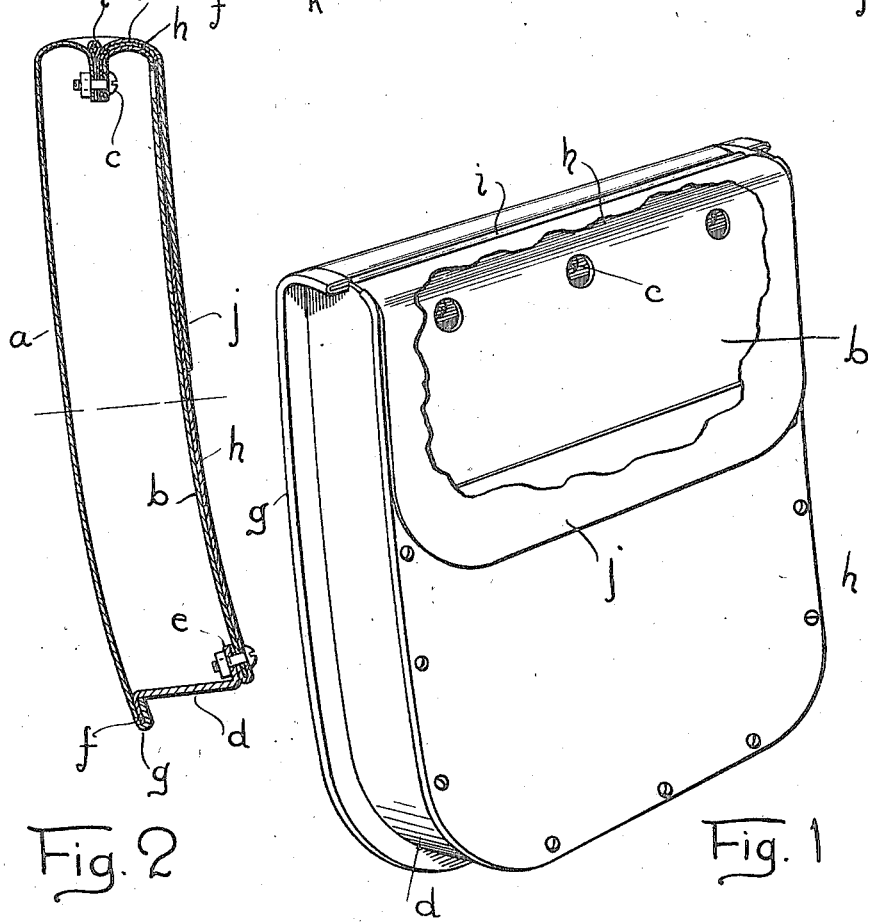

UNITED STATES PATENT OFFICE.

MAX ALVINUS BUCH, OF DETROIT, MICHIGAN.

AUTOMOBILE-DOOR.

1,158,438. Specification of Letters Patent. Patented Nov. 2, 1915.

Application filed April 3, 1915. Serial No. 18,894.

*To all whom it may concern:*

Be it known that I, MAX ALVINUS BUCH, a subject of the Emperor of Germany, residing at Detroit, county of Wayne, State of Michigan, have invented a certain new and useful Improvement in Automobile-Doors, and declare the following to be a full, clear, and exact description of the same, such as will enable others skilled in the art to which it pertains to make and use the same, reference being had to the accompanying drawings, which form a part of this specification.

This invention relates to an all metal vehicle door and especially to sheet metal doors for automobile bodies. It wholly does away with the necessity of the wooden door frame which carries the metal panels, molding and upholstering. The portions that go to make up this composite sheet metal door are so arranged that the leather, fabric or other flexible covering or facing on the inside of the door is very conveniently and neatly fastened in place. This composite sheet metal door is superior to the common form of door now in use by reason of its greatly increased lightness.

In the drawings, Figure 1 is a perspective of the door taken from the inner side and showing the pocket flap broken away. Fig. 2 is a vertical cross section. Fig. 3 is a horizontal cross section with parts of the body shown.

The door comprises what will be termed an outer panel *a* and an inner panel *b*, each of which is bent over at the top into the form of an inverted U in cross section and the two adjoining legs of the U portions bolted together by the bolts *c*. A spacing strip which forms the three edges of the door and reinforces the molding, comprises a Z-bar strip *d* of heavier metal than the panels and which is bent to form a U, as shown in Fig. 1, the two legs of which form the side edges of the door, and the bottom of the U forms the bottom edge of the door. One flange of this Z-bar serves to form a strip to which the inside panel is secured by bolts and nuts *e* while the other flange *f* serves as a stiffening member over which the two side edges and bottom edge of the panel *a* are bent to form a molding *g* for the door.

It will be noted that the upholstering cover *h* is folded under the two side and bottom edges of the panel *b* and is pinched between the panel *b* and the flange of the Z-bar by bolts and nuts *e*. The top edge of the covering or facing *h* is pinched between the united and bent-over edges of the panels *a* and *b*. A finishing strip *i* is also pinched between these bent-over upper edges of the panels *a* and *b* together with the covering or facing *h*. It will be further noted that the pocket flap *j* is also pinched between these bent-over edges of the panels. The inner panel *b* is provided with perforations which register with the bolt heads so that access may be had to the heads of the bolts for the purpose of removing or adjusting them.

The spacing strip *d* is considerably thicker than the other metal portions used in the door. This is necessary as most of the strain comes upon this spacing strip, and further, to it are attached the hinges *k* as well as some of the other devices which are conventionally attached to the edge of the door but which it is unnecessary here to show.

What I claim is:

1. A metallic door, having in combination, a Z-bar bent into U-shape, an outer panel doubled over one flange of the Z, thereby forming a reinforced molding, and an inner panel secured to the other flange of the Z-bar, the said outer and inner panels being secured together at the top.

2. A metallic door, having in combination, a spacing bar, comprising a Z-bar bent to U-shape, an outer panel having edges bent around one flange of the Z to form a reinforced molding, and an inner panel secured to the opposite flange of the Z, the said outer and inner panels having their upper edges bent over into inverted U-shape and secured together.

3. A metallic door, having in combination, a spacing bar, comprising a Z-bar bent to U-shape, an outer panel having edges bent over one flange of the Z to form a molding, an inner panel having edges secured to the other flange of the Z, the upper edges of the two panels being bent into inverted U-shape and secured together, and a covering or facing doubled over the edge of the inner panel and pinched between this panel and the flange of the Z-bar and at its top edge pinched between the meeting portions of the inner and outer panel.

4. A metallic door, having in combination, a spacing bar for the two sides and bottom of the door, an outer panel secured on said three sides to the spacing bar, an inner panel secured on said three sides to the spacing bar, the said outer panel and inner panel having their top edges bent over into inverted U-shape, said inner panel being provided with perforations along its upper edge, and screw bolts for securing the meeting edges of the two panels together, the said screw bolts being located in registry with the perforations in the inner panel so as to be accessible through the same.

5. A metallic door, having in combination, a spacing strip or bar forming two sides and the bottom of the door, an outer panel secured on the two sides and the bottom of the spacing strip, an inner panel secured on the two sides and the bottom of the spacing strip, the said inner panel and outer panel each being bent to inverted U-shape at the top edges, a covering or facing for the inner panel pinched between the inner panel and the spacing strip at the bottom and two sides and at the top pinched between the two meeting U-portions of the panels, and a flap pinched between the two meeting U-portions of the panels at the top.

In testimony whereof, I sign this specification.

MAX ALVINUS BUCH.